(12) United States Patent
Dahl et al.

(10) Patent No.: US 8,196,631 B2
(45) Date of Patent: Jun. 12, 2012

(54) FIBER TRANSFER APPARATUS FOR LAMINATING FIBER-REINFORCED SHEET MOLDING COMPOUND

(75) Inventors: Jeffrey S. Dahl, Livonia, MI (US);
Raymond Silva, Maumee, OH (US);
James E. DeVries, Canton, MI (US);
Carl F. Johnson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 12/277,735

(22) Filed: Nov. 25, 2008

(65) Prior Publication Data

US 2010/0126412 A1    May 27, 2010

(51) Int. Cl.
*B29C 65/00* (2006.01)
*B32B 37/00* (2006.01)
*B32B 38/04* (2006.01)
*B32B 38/10* (2006.01)
*D01G 25/00* (2006.01)
*D01G 27/00* (2006.01)

(52) U.S. Cl. .......... 156/512; 156/519; 156/265; 19/296; 19/299; 19/301; 19/302

(58) Field of Classification Search .................. 156/512, 156/265, 276, 308.2, 244.11, 244.18, 246, 156/519; 19/296, 299, 302, 301
See application file for complete search history.

(56) References Cited

U.S. PATENT DOCUMENTS

| | | | | |
|---|---|---|---|---|
| 3,034,180 A | * | 5/1962 | Greiner et al. | 19/301 |
| 3,839,114 A | * | 10/1974 | Schmidt et al. | 156/72 |
| 5,574,142 A | * | 11/1996 | Meyer et al. | 536/23.1 |
| 5,824,178 A | * | 10/1998 | Shingu et al. | 156/265 |
| 5,846,356 A | | 12/1998 | Vyakarnam et al. | |
| 5,888,340 A | | 3/1999 | Vyakarnam et al. | |
| 6,025,285 A | | 2/2000 | Vyakarnam et al. | |
| 7,598,421 B2 | * | 10/2009 | Hailes et al. | 564/295 |
| 7,691,223 B2 | | 4/2010 | Dahl et al. | |

* cited by examiner

*Primary Examiner* — Linda L Gray
(74) *Attorney, Agent, or Firm* — Raymond L. Coppiellie; Brooks Kushman P.C.

(57) ABSTRACT

A SMC lamination line is disclosed that has an upper carrier film and a lower carrier film with oriented chopped fibers being deposited between the carrier films. Resin paste or adhesive is provided to retain oriented fibers on the lower carrier film. A guide roller guides the carrier film in close proximity to an in-feed conveyor that feeds oriented chopped fiber unto the lower carrier film. The guide roller is preferably less than the diameter of the end roller of the feed conveyor. The guide roller is also preferably within the arc of movement of the ends of the oriented chopped fibers to ensure a smooth and non-disruptive transfer of the oriented chopped fibers to the lower carrier film.

16 Claims, 2 Drawing Sheets

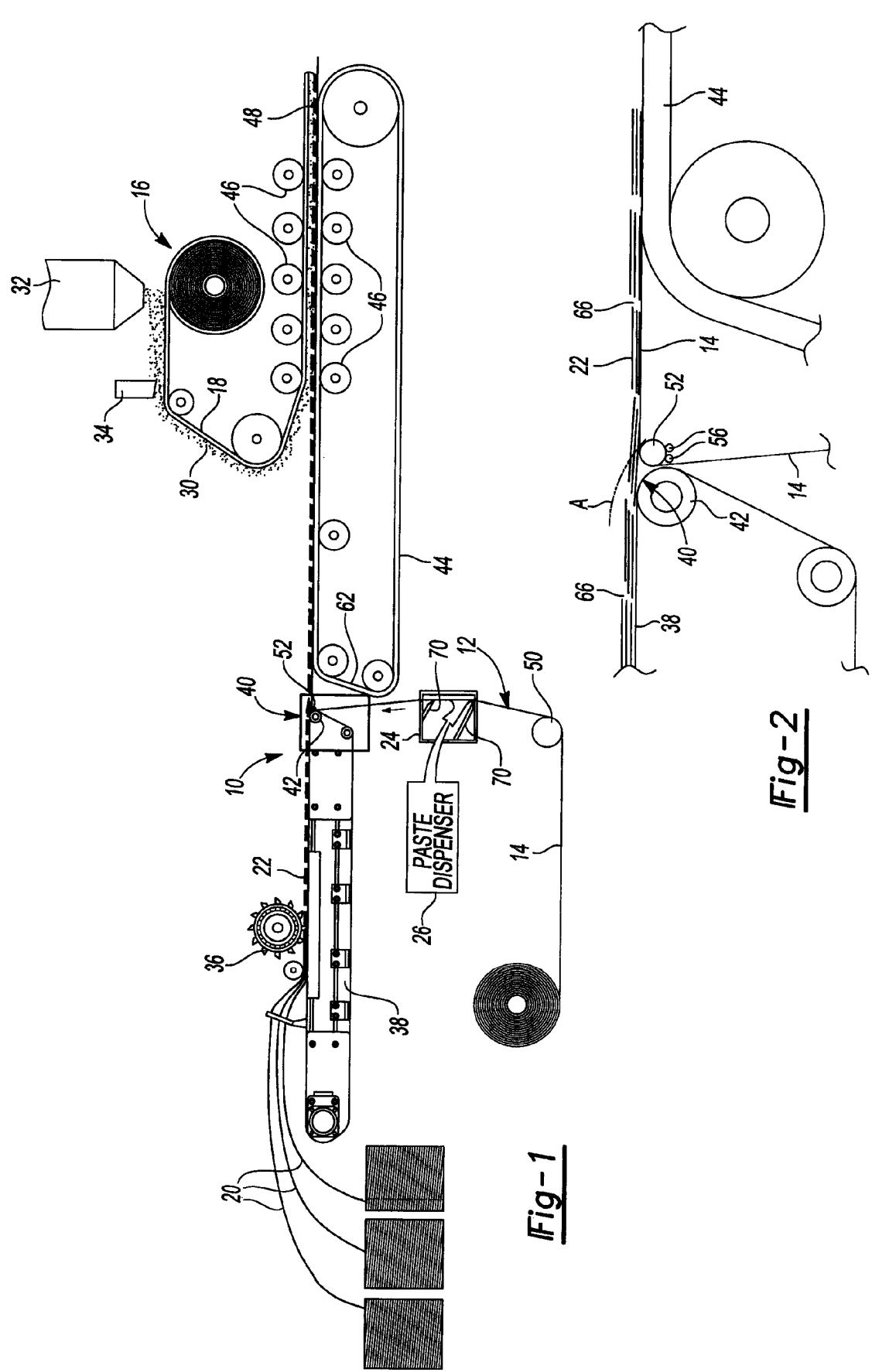

FIBER TRANSFER APPARATUS FOR LAMINATING FIBER-REINFORCED SHEET MOLDING COMPOUND

BACKGROUND OF THE INVENTION

1. Field of the Invention

The present invention relates generally to an apparatus for transferring oriented fibers utilized in making fiber-reinforced sheet molding compound.

2. Background Art

Sheet molding compound (SMC) is generally defined as a composite molding material made up of thermoset polymer material that may be reinforced with a fiber reinforcement. SMC products are molded to form high strength, lightweight, dimensionally stable and corrosion resistant products. SMC products are generally molded in matched die sets that apply heat and pressure to simultaneously cure, or cross-link, the SMC into a desired shape.

Fiber reinforcements in sheet molding compounds are generally deposited in a random orientation when the SMC compound is formed. SMC compounds may be reinforced by chopped fiber rovings, such as glass fiber, natural fibers, aramid, or carbon fiber. The randomly deposited chopped fiber rovings yield isotropic material properties in the molded component. Oriented chopped fibers provide localized areas of directional fiber reinforcement that yield anisotropic material properties. Currently, anisotropic material properties are obtained in SMC compounds by inserting a woven mat having continuous fibers between layers of a carrier polymeric film that is later stripped off of the SMC prior to molding.

One problem with using a continuous fiber woven mat is that the mat is more expensive than a continuous fiber roving. There is a need to weave the fibers together to form the mat. In addition, the woven mat impedes material flow during the molding process because the fiber is both continuous and mechanically connected by weaving. A previous application Ser. No. 11/627,097 filed Jan. 25, 2007, now U.S. Pat. No. 7,691,223, issued Apr. 6, 2010 filed by Applicants and their assignee proposed providing a directionally oriented discontinuous fiber reinforcement to be used in the manufacture of SMC. The oriented fibers provide the SMC with anisotropic stiffness/strength while utilizing low cost continuous roving fiber reinforcements.

SMC having directionally oriented discontinuous fibers provides increased flow properties during the molding process. According to the process proposed, SMC is manufactured utilizing a continuous roving which is then chopped into discontinuous segments of a desired length. Aligning the chopped fiber reinforcements along a common axis provides improved anisotropic material properties in the finished product.

A problem in implementing the process described in Applicants' above invention is that the chopped fibers are difficult to control after chopping as they are conveyed to the SMC carrier film and resin paste in the SMC manufacturing process. After chopping, the chopped fiber is transferred from the chopping unit and tends to fall randomly on the SMC carrier film and resin paste. Random distribution results in SMC that yields isotropic material properties instead of the desired anisotropic properties.

SUMMARY OF THE INVENTION

According to one aspect of the present invention, a fiber transfer apparatus is disclosed for depositing oriented chopped fibers onto a film to form SMC. The fiber transfer apparatus comprises a feed conveyor that receives chopped fiber from a fiber chopping machine and conveys the chopped fibers to a discharge end that is entrained around an end roll of the conveyor. A film feed system, including a film in-feed roller and a guide roller, are disposed adjacent the discharge end of the feed conveyor. The film moves across the guide roller that is disposed within an arc followed by a leading end of the chopped fibers as the fibers are rotated around the end roller of the feed conveyor.

According to another aspect of the present invention, an oriented chopped fiber transfer apparatus for a sheet molding compound (SMC) laminating line is provided. The apparatus comprises a feed conveyor that conveys chopped fibers to a discharge end that is entrained around an end roller of the feed conveyor. Means are provided for collecting the oriented chopped fibers from the discharge end of the feed conveyor on a moving carrier film while maintaining the orientation of the fibers.

According to another aspect of the present invention, a vertical doctor box assembly is provided for applying a resin paste to a carrier film as the carrier film is moved in a vertical direction. The doctor box assembly comprises a paste dispenser having a base wall that is disposed at an angle relative to the carrier film as it is moved in the vertical direction past the base wall. A doctor blade is provided near the top of the doctor box, spaced from the base wall, and adjacent to the carrier film. First and second lateral containment walls engage the base wall at laterally spaced locations. The resin paste is deposited on the base wall between the first and second lateral containment walls and flows into contact with the film. The doctor blade controls the thickness of the resin paste deposited on the carrier film.

BRIEF DESCRIPTION OF THE DRAWINGS

FIG. 1 is a schematic side elevation view of a SMC machine used to produce SMC laminate;

FIG. 2 is a fragmentary side elevation view showing the oriented fiber transfer conveyor discharge end and film guide that guides the film as it picks up the oriented fibers;

DETAILED DESCRIPTION OF THE PREFERRED EMBODIMENT(S)

Figure 4:
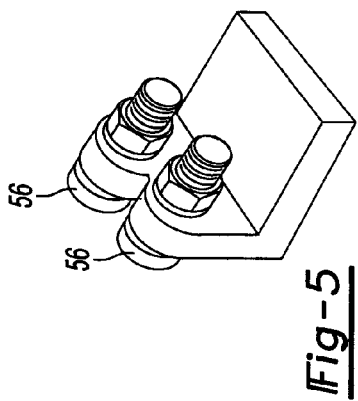
FIG. 4 is a perspective view of a doctor box that provides the resin paste to the film.

Referring to FIG. 1, the SMC lamination line 10 is diagrammatically illustrated. A lower carrier film feed system 12 feeds a lower carrier film 14. An upper carrier film feed system 16 guides an upper carrier film 18. Fiber rovings 20 are supplied to the line as a continuous strand and are then cut into oriented chopped fibers 22 that are deposited between the lower carrier film 14 and upper carrier film 18. A resin paste doctor box 24 is positioned adjacent to the lower carrier film 14 and applies a resin paste 26 to the lower carrier film 14. The oriented chopped fibers 22 are deposited on the resin paste 26 on the lower carrier film 14.

Resin paste 30 is applied by a resin paste dispenser 32 to the upper carrier film 18. The resin paste 30 is leveled by a doctor blade 34 that is disposed above the upper carrier film 18.

The fiber rovings 20 are cut in a chopper 36 to uniform lengths and oriented chopped fibers 22 are deposited on a feed conveyor 38. The feed conveyor 38 moves in a longitudinal direction that is aligned with the direction of the oriented chopped fibers 22 after they are cut from the fiber rovings 20. The feed conveyor 38 has a discharge end 40 that is entrained around an end roller 42 of the feed conveyor 38. A carrier film support conveyor 44 supports the lower carrier film 14 as it is conveyed toward the upper carrier film 18. The carrier film support conveyor 44 also supports the upper carrier film 18 and the oriented chopped fibers 22. The oriented chopped fibers 22 are held in place by the resin paste 26 and resin paste 30 while the components are compressed in compression rollers 46, or a chain belt compactor. The resin paste 26 and resin paste 30 may be of the same or different composition. A finished resin sheet 48 is formed by the compression rollers 46 compressing the lower carrier film 14, upper carrier film 18, oriented chopped fibers 22, resin paste 26 and resin paste 30. After the resin sheet 48 is formed, it may be cut into a desired lengths or cut in a blanking operation to a desired blank shape. The carrier films 14, 18 are subsequently stripped from the resin sheet 48 prior to molding. After the resin sheet 48 is cut, it may be then placed in conventional molding equipment to form parts to the desired contour.

Figure 5:
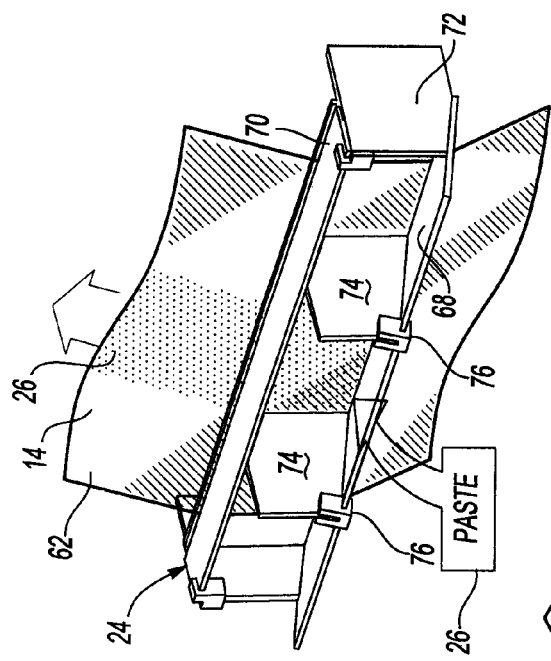
FIG. 5 is a perspective view of back up roller bearings that provide support for the guide roller.
Figure 3:
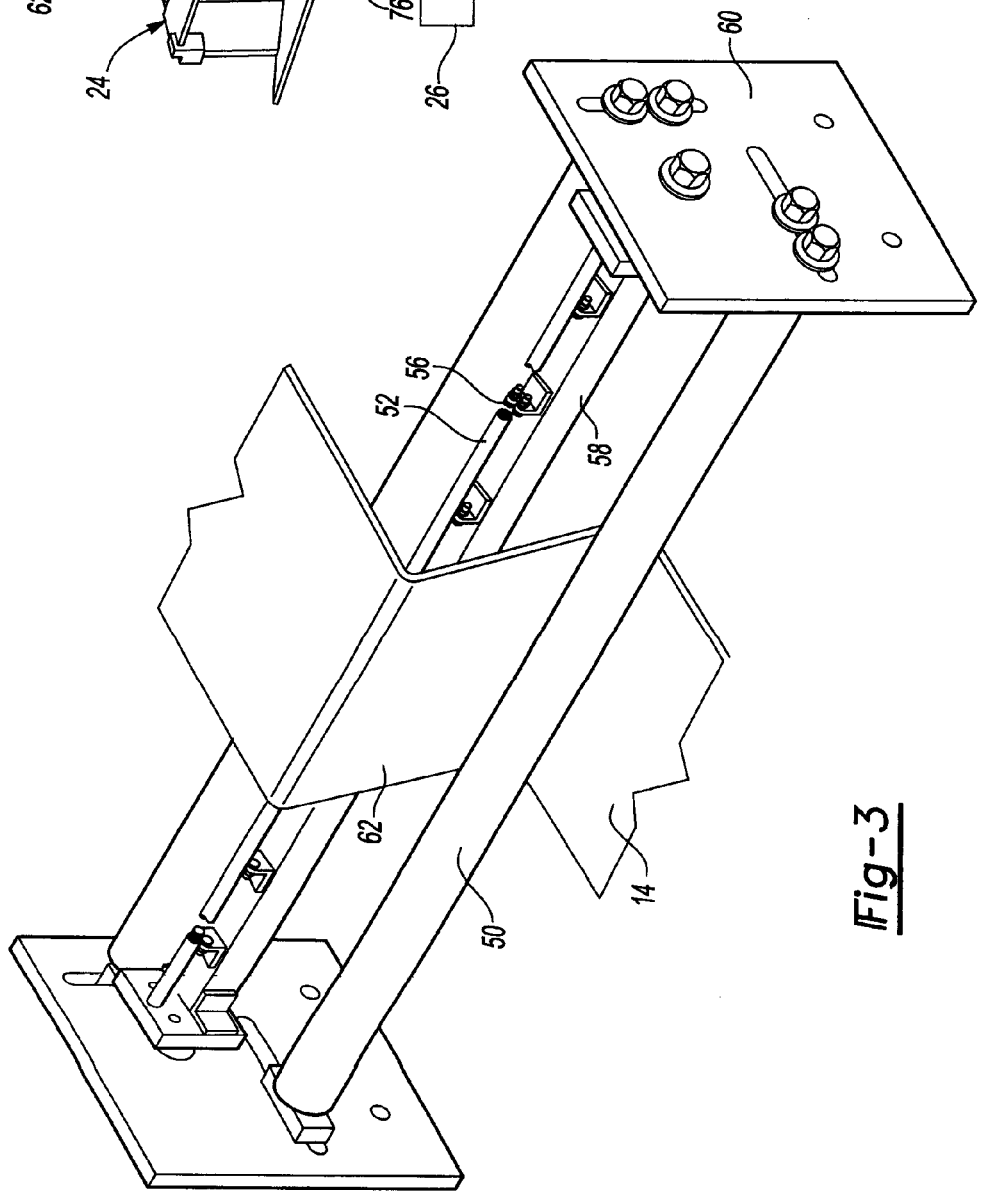
FIG. 3 is a perspective view of a film guide guiding a film adjacent to the discharge end of an oriented fiber transfer conveyor.

Further, referring to FIGS. 1-3, the portion of the line that comprises the fiber transfer apparatus is described in greater detail. The transfer apparatus includes a carrier film in feed roller 50 that is disposed below a guide roller 52 that guides the lower carrier film 14 as it is moved past the discharge end 40 of the feed conveyor 38. As shown in FIGS. 1, 3 and 5, the guide roller 52 is supported by back up roller bearings 56 that are in turn supported on a support bracket 58. The support bracket 58 extends between side walls 60 of the fiber transfer apparatus. The lower carrier film 14 passes below the carrier film in-feed roller 50 and in a vertical direction to the guide roller 52. As used herein, a substantially vertical orientation of the vertical segment 60 is defined as being between 80 and 100° relative to horizontal, or relative to the plane of the top surface of the feed conveyor 38.

The oriented chopped fibers 22 are oriented to extend in a longitudinal direction which is the same direction that the feed conveyor 38 moves the fiber 22 towards the lower carrier film 14. The leading end 66 of the fibers 22 follow the arc of movement that is generally indicated by the letter "A" as they are transferred from the discharge end 40 of the feed conveyor 38. The guide roller 52 is disposed as close as possible to the discharge end 40 of the feed conveyor 38 and are intended to be within the arc of movement A of the leading ends 66 of the fibers 22. By locating the guide roller 52 closely adjacent the discharge end 40 of the feed conveyor 38, the fibers are smoothly transferred from the feed conveyor 38 to the lower carrier film 14. By minimizing disruption of the orientation of the fibers 22, orientation of the fibers may be maintained.

Referring to FIGS. 1 and 4, the resin paste doctor box 24 is described in greater detail. The doctor box 24 is arranged to provide resin paste 26 to a localized portion of the lower carrier film 14. As described with reference to FIG. 1 above, the paste 26 is applied to the lower carrier film 14 immediately prior to receiving the oriented chop fibers 22. The doctor box 24 is positioned to apply the paste 26 to the vertical segment 62 of the lower carrier film 14 between the in-feed roller 50 and the guide roller 52. In this way, the resin paste 26 is not deposited on the in-feed roller 50, but is deposited immediately prior to receiving the chopped fibers 22. The doctor box 24 includes a base wall 68 that includes a doctor blade 70 so that paste deposited by the doctor box 24 is evenly applied to the surface of the carrier film 14. The doctor box 24 includes end walls 72 on opposite lateral sides thereof. A pair of adjustable lateral containment walls 74 are provided within the doctor box 24 and are secured in place by means of an adjustable retainer 76 that hold the lateral containment walls 74 in a desired location for applying paste 26 to the carrier film 14.

While the best mode for carrying out the invention has been described in detail, those familiar with the art to which this invention relates will recognize various alternative designs and embodiments for practicing the invention as defined by the following claims.

What is claimed:

1. A fiber transfer apparatus comprising;
   a feed conveyor moves loose chopped fibers in a longitudinal direction, wherein the loose chopped fibers are aligned in the longitudinal direction to transfer the loose chopped fibers to a discharge end that is entrained around an end roller; and
   a carrier film feed system includes a carrier film that is guided by an in-feed roller and a guide roller that is disposed adjacent the discharge end, the carrier film moves across the guide roller that is disposed within an arc followed by a leading end of the loose chopped fibers as the fibers are rotated around the end roller, wherein the loose chopped fibers are smoothly transferred in the longitudinal direction from the feed conveyor to the carrier film to minimize disruption of the chopped fibers and to maintain the alignment of the loose chopped fibers in the longitudinal direction on the carrier film.

2. The fiber transfer apparatus of claim 1 wherein the guide roller is less than the diameter of the end roller.

3. The fiber transfer apparatus of claim 1 wherein the guide roller is supported between opposite ends by a plurality of roller bearings.

4. The fiber transfer apparatus of claim 1 wherein the guide roller is disposed above the in-feed roller and guides the carrier film at an angle approximately equal to 90° relative to the direction that the carrier film is conveyed away from the guide roller.

5. The fiber transfer apparatus of claim 1 wherein the guide roller is disposed above a rotation axis of the end roller and guides the carrier film as close as possible to the discharge end without contacting the discharge end.

6. The fiber transfer apparatus of claim 1 further comprising a resin paste applicator that applies a resin paste to the carrier film as the carrier film is moved vertically from the in-feed roller to the guide roller.

7. The fiber transfer apparatus of claim 6 wherein the resin paste applicator is a doctor box assembly.

8. The fiber transfer apparatus of claim 1 wherein the carrier film follows a substantially horizontal path after passing over the guide roller.

9. The fiber transfer apparatus of claim 1 wherein the guide roller and the in-feed roller are supported on opposite ends by a pair of end plates.

10. The fiber transfer apparatus of claim 9 wherein the guide roller, a plurality of roller bearings and a rail supporting the roller bearings are assembled together as a sub-assembly before being assembled between the pair of end plates.

11. A sheet molding compound (SMC) forming apparatus comprising:
    a continuous fiber roving;
    a lower carrier film;
    an upper carrier film;
    a fiber roving cutter that cuts the continuous fiber roving into a plurality of unrestrained chopped fibers;
    a feed conveyor receives the unrestrained chopped fibers in alignment with the longitudinal direction that the feed conveyor moves the fibers and conveys the chopped fibers that are maintained in alignment with the longitudinal direction to a discharge end entrained around an end roller;

a lower carrier film feeder that moves the lower carrier film wherein the lower carrier film is entrained around a lower roller to pass upwardly to a guide roller at angle from below the feed conveyor to a location adjacent to the discharge end of the feed conveyor;

a doctor box disposed adjacent to the lower carrier film between the lower roller and the guide roller, wherein the doctor box receives a resin paste and applies the resin paste to the lower carrier film;

a plurality of leading ends of the chopped fibers are held by the resin paste applied to the lower carrier film as the chopped fibers are received from the discharge end of the feed conveyor while maintaining the chopped fibers in alignment with the longitudinal direction after being deposited on the lower carrier film; and an upper carrier film feeder applies the upper carrier film over the longitudinally aligned chopped fibers, the resin paste and the lower layer of polymer carrier film.

12. The sheet molding compound forming apparatus of claim 11 further comprising a carrier film feed system that conveys the lower carrier film vertically upwardly from the lower roller to a guide roller.

13. The sheet molding compound forming apparatus of claim 12 wherein the guide roller is disposed within an arc followed by a leading end of the oriented fibers as the oriented fibers are rotated around the end roller.

14. The sheet molding compound forming apparatus of claim 11 further comprising the guide roller that is supported between opposite ends by a plurality of roller bearings.

15. The sheet molding compound forming apparatus of claim 11 further comprising the guide roller disposed above the in-feed roller and guides the lower carrier film at an angle that is approximately equal to 90° relative to the direction that the lower carrier film is conveyed away from the guide roller, and wherein the guide roller is disposed above a rotation axis of the end roller and guides the lower carrier film as close as possible to the discharge end without permitting the resin paste to contact the discharge end.

16. A sheet molding compound (SMC) forming apparatus comprising:

a continuous fiber roving;

a lower carrier film;

an upper carrier film;

a fiber roving cutter that cuts the continuous fiber roving into a plurality of unrestrained chopped fibers;

a feed conveyor receives the unrestrained chopped fibers in alignment with the longitudinal direction that the feed conveyor moves the fibers and conveys the chopped fibers that are maintained in alignment with the longitudinal direction to a discharge end entrained around an end roller;

a lower carrier film feeder that moves the lower carrier film wherein the lower carrier film passes below the feed conveyor to a location adjacent to the discharge end of the feed conveyor;

a device that receives a resin paste and applies the resin paste to the lower carrier film;

a plurality of leading ends of the chopped fibers are held by the resin paste applied to the lower carrier film as the chopped fibers are received from the discharge end of the feed conveyor while maintaining the chopped fibers in alignment with the longitudinal direction after being deposited on the lower carrier film; and an upper carrier film feeder applies the upper carrier film over the longitudinally aligned chopped fibers, the resin paste and the lower layer of polymer carrier film.

\* \* \* \* \*